United States Patent [19]

Freiesleben

[11] Patent Number: 5,171,475
[45] Date of Patent: Dec. 15, 1992

[54] SOIL-REMOVAL MICROEMULSION COMPOSITIONS

[75] Inventor: Ernst R. Freiesleben, St-Didace, Canada

[73] Assignee: Penetone Corporation, Tenafly, N.J.

[21] Appl. No.: 604,904

[22] Filed: Oct. 25, 1990

[51] Int. Cl.$^5$ .............................................. B01J 13/00
[52] U.S. Cl. .................................... 252/312; 252/355; 252/545; 252/DIG. 14
[58] Field of Search ........ 252/312, 545, 355, DIG. 14

[56] References Cited

U.S. PATENT DOCUMENTS

| | | | |
|---|---|---|---|
| 3,535,160 | 10/1970 | Arger | 134/22 |
| 3,639,262 | 2/1972 | Milligan | 252/355 |
| 3,959,134 | 5/1976 | Canevari | 210/59 |
| 4,180,472 | 12/1979 | Mitchel et al. | 252/162 |
| 4,502,926 | 3/1985 | Barber, Jr. | 204/45.1 |
| 4,601,847 | 7/1986 | Barber, Jr. | 252/312 |

Primary Examiner—Richard D. Lovering
Assistant Examiner—N. Bhat
Attorney, Agent, or Firm—Darby & Darby

[57] ABSTRACT

Disclosed are emulsions made by simple agitation of about 99.9–20% water and about 0.1–80% progenitor solutions, the latter containing at least one surfactant, at least one solvent, and at least one emulsifier, the solvent being of selected polarity and all the ingredients being of selected refractive index. Also disclosed are methods of obtaining emulsions of a desired cleaning ability (which may be targeted to a specific cleaning task) and cost using a correlation (polarity/refractive index function) between cleaning ability, polarity of the solvent and refractive index of the solvent and other additives.

23 Claims, 3 Drawing Sheets

SOIL-REMOVAL MICROEMULSION COMPOSITIONS

FIELD OF THE INVENTION

This invention relates to novel soil-removal emulsion or microemulsion compositions of optimized cleaning power which are made by a method that is simpler than methods for making emulsion microemulsion or biliquid foam polyaphron compositions currently known in the art. In another aspect, the invention relates to a method for using such compositions for cleaning (especially industrial cleaning) purposes.

BACKGROUND OF THE INVENTION

Biliquid foams consist of a water-insoluble liquid "bubble" (or "globule" or "internal phase") trapped within a film of an aqueous surfactant-containing solution ("external" or "continuous phase"). Biliquid foams have very small "bubbles" (e.g., of a diameter in the order of a micron or even a submicron). The foams have been recognized for use in cleaning generally because such bubbles are said to be stable and to have a relatively large surface/volume ratio.

U.S. Pat. No. 4,486,333 issued Dec. 4, 1984 to Sebba discloses and claims a method for preparing such a biliquid foam composition of the polyaphron type (Col. 1, lines 35–47) for use inter alia in cleaning (Col. 6, lines 31–41) or in making dispersions from concentrates of emulsified liquids (Col. 6 lines 23–31) to be used, e.g., in solvent extraction. The '333 polyaprhons have globules of 0.1–10 microns and a PVR (phase volume ratio, i.e., ratio of volume of discontinuous phase to volume of lamellar continuous phase) of up to about 50.

First, according to '333, an ordinary gas foam is prepared using water and/or another hydrogen-bonded liquid such as an alcohol or glycol and a water-soluble surfactant; intermittently, a limited amount of a nonpolar water-immiscible liquid is added and the mixture is agitated to cause the nonpolar liquid to spread on the foam surface and to form noncoalescing globules of nonpolar liquid dispersed in a continuous phase of hydrogen-bonded liquid. Each globule is encapsulated in a double-surfaced film of surfactant and water. The nonpolar liquid and the surfactant are said to be selected to have a spreading coefficient greater than or equal to zero to permit the nonpolar liquid to initially spread as a thin sheet on the surfactant-containing aqueous lamellae and then to break up into fragments and globules (of 0.1–10 micron size) (Col. 2, lines 55–68).

The total amount of nonpolar liquid thus encapsulated is between 40 and 98% by volume of the entire composition and the PVR is at least 1.5 and up to 49 ('333, claim 1).

The surfactant in '333 can be any anionic, cationic or nonionic surfactant that would produce a good foam (as long as it fulfills the above spreading coefficient relationship) and it is used in an amount preferably at least about 0.3% by weight of the water (Col. 4, lines 26–32).

The '333 nonpolar liquid also preferably contains a small (up to 5% by weight) quantity of a soluble nonionic surfactant that permits the nonpolar liquid to spread on the aqueous film (Col. 4, lines 50–62).

The '333 invention suffers from the disadvantage that it is difficult to prepare. Also, there is no attempt to tailor a particular polyaphron to a given cleaning task other than as a fuel additive and as a foaming gel although cosmetic applications are alluded to. See, e.g., '333 Example 4.

U.S. Pat. No. 4,606,913 issued to Aronson on Aug. 19, 1986 also concerns high-internal phase emulsions (i.e., emulsions in which the internal phase constitutes 74–75% of the total volume) (Col. 1, lines 9–16). Use in industrial cleaning applications is disclosed (Col. 1, line 30).

The '913 patent recognizes that choice of the emulsifier affects the stability of these emulsions and further proposes the incorporation of "an electrolyte" in the emulsion, particularly in the aqueous phase to improve stability. Although any type of electrolyte is said to be suitable and trivalent inorganic salts are said to be preferred, only magnesium sulfate and potassium sulfate are claimed (Col. 9, line 9; Col. 10, line 60).

The emulsifiers generally named in the '913 patent are conventional, generally nonionic, emulsifiers usually having an HLB (hydrophilic to lyophilic balance) between 1 and 7 and are said to include combinations of sorbitan trioleates; mono- and multi-phosphoric esters of oleic acid; polyoxyethylene sorbitol hexastearates, ethylene glycol fatty acid esters, glycerol mono-180 stearates, and sorbitan monooleates; polyoxyethylene 2-oleyl ethers, glycerol/fatty alcohol ethers, esters of polyalcohols, polyethoxylated 2-oleyl alcohols, synthetic primary alcohol ethylene oxide condensates; and mono- and diglycerides of fat-forming fatty acids (Col. 5, lines 34–67). Emulsifiers are said to be present at 5–30% by weight of the external phase.

The '913 emulsions are said to be prepared by incorporating the emulsifier in the oil phase and the electrolyte in the aqueous phase and adding the aqueous phase to the oil phase in small aliquots (not more than 15% of the total oil phase at a time).

U.S. Pat. No. 3,976,582 issued to Douglas on Aug. 24, 1976 discloses a method for making and stabilizing micellar systems including microemulsions having maximum zeta potential for optimizing the recovery of petroleum from shale rock and other subterranean formations and minimizing the undesirable adsorption of surfactant or rock formations.

The micellar systems are said to be made in accordance with known techniques. They comprise 5–20% surfactants (which can be anionic or cationic), 5–60% hydrocarbon solvent, 10–60% electrolyte-containing water and 1–3.5% "co-surfactant". Cosurfactants are co-solubilizers i.e., semipolar organic compounds, preferably alcohols.

The '582 invention involves measuring the zeta potential of a range of micellar systems (varying in aqueous phase content) (the zeta potential is normalized to account for differences in electric conductivity) and selecting as optimum those compositions that have a maximum or near maximum systemic zeta potential.

U.S. Pat. No. 4,542,745 discloses an oil-in-water emulsion for use in medical ultrasonic probes containing as the aqueous phase water and alcohol, glycerol or lower alkylene glycol. The oil phase is silicone fluid and is in droplets of 0.15 microns to 1.5 microns in diameter.

U.S. Pat. No. 3,813,345 issued to Urton on May 28, 1974 is directed to a method for reducing the micelle size of an oil-in-water emulsion (wherein the oil phase contains an organic solvent, a surfactant and an unsaturated organic compound soluble in the solvent and the aqueous phase in water) by adding to such an emulsion a water-soluble resin with a high number of positive-ion accepting sites and equilibrating this resin with a positive ion donor to cause it to have the same sign of (surface) charge (positive or negative) as the micelles, thereby causing further subdivision of the micelles. The disclosed use for such micellar systems is in insecticide preparations.

U.S. Pat. No. 4,472,291 issued to Rosano on Sep. 18, 1984 discloses viscous oil-in-water microemulsions containing a surfactant, a co-surfactant (emulsifier) and a secondary surfactant which has the property of increasing the viscosity of the microemulsion. The stated uses of such microemulsions include hard surface cleaners, shampoos, lotions, salves or creams, car waxes, window cleaners, anti-rust formulations and floor polishes (col. 5, lines 35–40).

U.S. Pat. No. 4,592,859 issued to Smith-Johannsen on Jun. 3, 1986 is directed to stable suspensions of oil and water in which the droplets of the discontinuous phase are surrounded by colloidal particles having a zeta potential within the range of $+18$ to $-18$ mV. The suspensions are prepared by adding to water a combination of surfactants (anionic and cationic) which form colloidal particles with the requisite zeta potential. The oil phase is then added. Disclosed uses include cleaning and polishing compositions, paints, varnishes, impregnants for porous surfaces, cosmetics, cement additives, industrial oils and waxes. Pharmaceutical and agricultural uses are also mentioned.

All of the foregoing prior art systems entail complicated and time-consuming formulation methods, and/or are not suitable for industrial cleaning applications. They require special equipment and/or calculations and/or sophisticated additives (such as water soluble resins or electrolytes) as well as specific methods of addition of the dispersed phase to achieve the necessary stability and/or globule configuration (size and type of the dispersed phase). As a result, the prior art systems are expensive and, most important, their use is confined to specialty applications and they lack the versatility necessary for an industrial-type cleaning composition.

SUMMARY OF THE INVENTION

This invention is directed in one aspect to emulsions or microemulsions prepared by simple agitation of water and quantities of single-phase compositions (hereafter "progenitor solutions") which contain a combination of at least one surfactant, at least one solvent and at least one emulsifier, the solvent being of selected polarity and all ingredients being of selected refractive index. The resulting emulsion/microemulsions (hereafter simply "emulsions") are highly stable and have optimal cleaning ability for a variety of industrial cleaning applications. The foregoing emulsions contain between about 0.1 and about 80% of progenitor solution.

In another aspect, the present invention provides a convenient guide (more specifically a function of solvent polarity and "collective refractive index"—defined below) for varying any ingredient used in the foregoing progenitor solutions and/or the amount of such ingredient in a manner which increases the cleaning ability of emulsions formed using the progenitor solutions. The emulsions of the present invention can thus be optimized for cleaning ability (and can be targeted to a particular cleaning task) and, if desired, cost, without using expensive ingredients (such as exotic surfactants or emulsifiers) without using electrolytes and without using special equipment (e.g. equipment to measure zeta potentials).

In yet a third aspect, the present invention is directed to methods of using the foregoing progenitor solutions and emulsions for particular industrial cleaning and soil-removal applications including without limitation removal of tar and/or oil or greases from sand, industrial equipment and other inanimate objects, such as removing thick oils and other soils from hard surfaces (metal, wood, glass concrete, etc.).

DETAILED DESCRIPTION OF THE INVENTION

The present invention involves first the formation of stable "single-phase" progenitor solutions which contain 60 to 98% of an organic solvent (preferably 70 to 90%);
1 to 20% of a surfactant or combination of surfactants soluble in the solvent (preferably 5 to 20%); and
1 to 20% of an emulsifier (preferably 2 to 8%).

The progenitor solutions are then used to prepare stable emulsions or microemulsions (water-in-oil or preferably oil-in-water) having powerful soil-removal capacity. Both the progenitor solutions and the emulsions made from them can be formulated to be particularly effective in one or more particular cleaning applications. In fact, the emulsions of the present invention even when produced from a small percentage of progenitor solution (and containing therefore a small percentage of cleaning agents) are particularly effective soil removal agents. Depending on the choice of solvents, surfactants and emulsifiers, and on the extent of dilution either a true emulsion or a microemulsion may form from the progenitor solutions. Typically true emulsions, i.e. opaque milky liquids result on dilution. However, true microemulsions, i.e. translucent or almost transparent liquids are also occasionally observed.

It is well known in the art that in order to have effective cleaning agents, the soil to be removed must be penetrated, solvated and removed (sequestrated) from the substrate and dispersed in a cleaning medium. Penetration and dispersion are achieved by surfactants. Ionic surfactants affect the electrostatic properties of the surface to which they adsorb (or film in which they are resident). Nonionic surfactants by orienting their hydrophilic moiety into the so-called Stern layer surrounding a wetted soil particle (assuming the medium is aqueous) promote dispersion and inhibit agglomeration.

Similar principles apply to stabilization of cleaning emulsion compositions. Stability of an emulsion is promoted by surfactants which act as emulsifiers. They should have good solubility in both the aqueous and the oil phase. Often, combinations of surfactants are more effective as emulsifiers than single compounds, as is well known in the art. See, generally *Surfactants and Interfacial Phenomena*, M. J. Rosen, Wiley 1978.

The electrical properties of a film or surface are very important in stability of cleaning emulsions and in effectiveness of cleaning ability. The electrostatic surface charges can be measured, but expensive equipment is necessary. A simpler method for optimizing stability and cleaning performance of emulsions is provided below by the present invention.

Refractive index and polarity of a liquid provide a measure of the electrostatic properties of that liquid. The present inventor was able to correlate the cleaning ability of various emulsions to the polarity and refractive index of their ingredients and corresponding concentration of each ingredient in the progenitor solution. Stabilization of the resulting emulsion is governed by the equilibrium of the surfactants within the progenitor solution i.e., surfactants/emulsifiers are added until they are able to completely emulsify or suspend particles of a liquid in a second immiscible liquid. This is done by routine experimentation well within the skill of the art.

According to the present invention, an arbitrary polarity scale is first established for various solvents based on the physiochemical characteristics of each solvent. This can be done by using, for example, Snyder's Polarity Index, incorporated by reference. See Snyder, I. R., *J. Chromatography Sci.*, 16:223, 1978. However, any other polarity scale could be used to generate a polarity-/index function (defined infra).

Table 1 below contains nonlimiting examples of solvents suitable for use in this invention and their assigned polarities (on a scale from 1 to 10).

A collective polarity P can then be calculated for the solvent components of a particular composition as the weighted sum of the polarity of the solvents contained in a given composition according to the formula:

$$P = \sum_{i=1}^{n} (S_i P_i)$$

where i is an integer from 1 to n, n is the total number of solvents in the composition; $S_i$ is the weight fraction of each solvent based on the total composition of the progenitor solution; and $P_i$ is the polarity of that solvent.

Refractive index values for the emulsifiers, surfactants and solvents are used to calculate a collective refractive index $N_D$ in the same manner $$N_D = \sum_{i=1}^{n} X_i N_i$$

wherein $X_i$ is the weight fraction of a particular component (surface active agent or solvent) and N is the refractive index of the same component. Refractive indices for solvents are readily available in the literature (see, e.g., The Merck Index, 11th Ed. and the Handbook of Chemistry and Physics, Chemical Rubber Publ. Co., Cleveland, Ohio) as are those for surfactants.

The ability of each composition to clean a particular type of soil is then measured and the results are correlated with the following empirical polarity/refractive index function (PIF):

$$\frac{(10 \cdot N_D)(P)}{(10 - P)}$$

See FIGS. 1-3 by way of nonlimiting example.

BRIEF DESCRIPTION OF THE DRAWINGS

In FIGS. 1-3 the ability of compositions within the invention to remove tarsand soil when formulated into a emulsion containing 10% of a progenitor solution is plotted against the polarity/index function for each composition. (See data points.) The three figures correspond to the data of Table 3 for 3 types of emulsifier Emulsogen IT (FIG. 2), Emulsogen SHT (FIG. 1) and Emulsogen EL (FIG. 3). The straight lines drawn through FIGS. 1-3 represent the best straight-line fit but the cleaning ability is assessed much more accurately by reference to the critical PIF value. Critical PIF value is a value of the polarity index function which when matched or exceeded by variation of the content and chemical identity of the constituents of a progenitor solution results in formation of emulsions essentially all of which have cleaning ability of 60% or more (when cleaning ability is measured by the procedure of the Examples). Critical PIF is thus a function of the particular cleaning task, and is independent of the ingredients of the progenitor solution.

Figure 1:
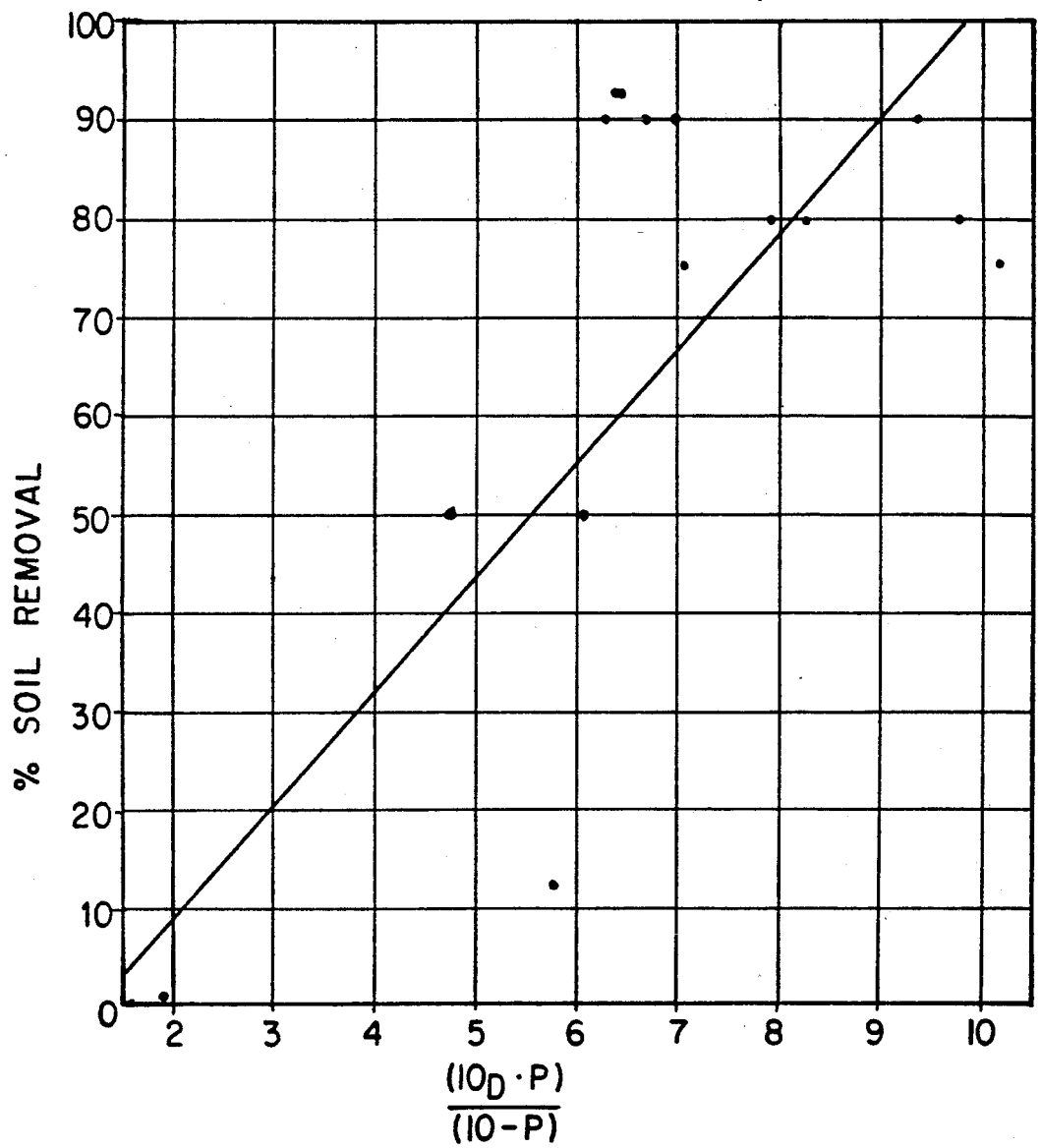
FIG. 1 is a graph of soil removal ability plotted against the polarity/index function for the emulsifier Emulsogen SHT.
Figure 2:
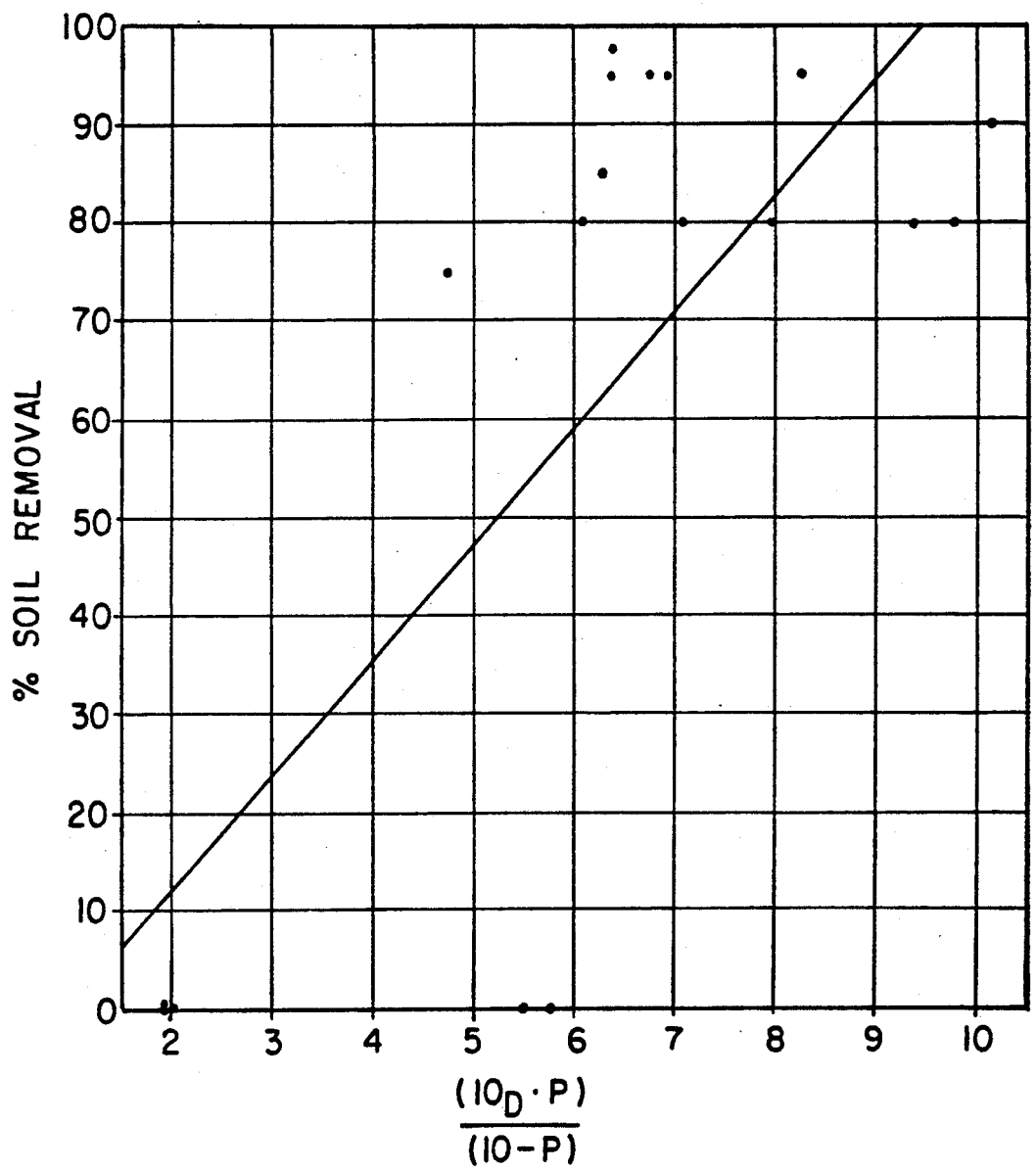
FIG. 2 is a graph of soil removal ability plotted against the polarity/index function for the emulsifier Emulsogen IT.
Figure 3:
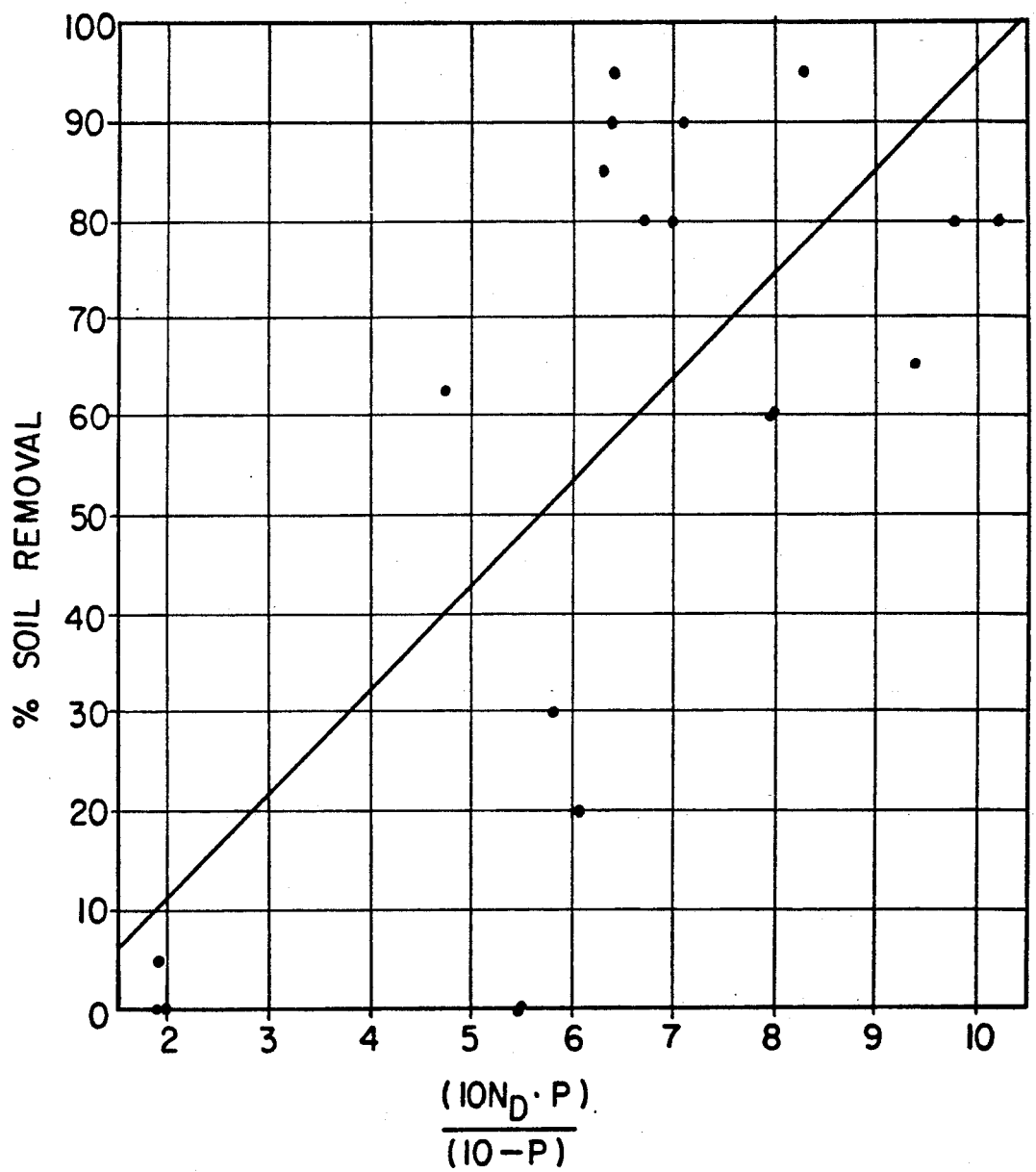
FIG. 3 is a graph of soil removal ability plotted against the polarity/index function for the emulsifier Emulsogen EL.

It transpires from FIGS. 1-3 that tarsand soil (to be removed to a substantial extent, i.e. 60-100%) needs a cleaning composition with a high polarity-index function (in the case of FIGS. 1-3 given the polarity scale used and the experimental procedure and parameters for assessing cleaning ability the critical PIF value is no less than about 6; in fact a substantial increase in cleaning ability is almost universally observed when the PIF is higher than the critical value). This means that the best compositions for cleaning tarsands should have both relatively high polarity and relatively high index of refraction. Indeed, the preferred compositions exemplified below have a collective refractive index $N_D$ of about 1.4 or more and a collective solvent polarity of about 3.0 or more. Thus, once the critical value of the polarity-index function has been identified, it is possible to conveniently select emulsions that will have a desired cleaning ability for a given task by selecting a combination of ingredients and contents which will yield an emulsion with a PIF value equalling or exceeding the critical value. The selection can be refined further (if desired) using no more than routine experimentation consistent with the present disclosure.

Similar empirical plots can be generated for other soils than tarsand using only routine experimentation. Thus, the combination of the present invention can be optimized for each cleaning use by identifying the critical polarity index function value for a particular application. It should be emphasized, however, that the cleaning compositions that are most effective for tarsands are also generally effective for other industrial cleaning tasks as tarsand removal is a particularly difficult cleaning task. It is also possible to develop straight-line models for the relationship between soil-cleaning ability and Polarity/Index Function value for each type of soil by using various statistical techniques such as linear regression analysis applied to data such as those of Table 3. In practice, however, this does not appear to be necessary as it is normally easy to identify the critical value for the polarity-index function (which may or may not be numerically the same for different cleaning applications).

It is envisioned that each progenitor solution within the invention will contain at least one organic solvent suitable for removing the target soil(s), i.e., having sufficient affinity to the soil to solvate it. Nonlimiting examples of species and categories of suitable commercially available solvents and their assigned polarities are set forth in Table 1.

TABLE 1

| SOLVENT | POLARITY OF SOLVENTS GENERIC NAME/CATEGORY | POLARITY |
|---|---|---|
| Solvesso 150 | aromatic hydrocarbons solvent | 3 |
| Butyl Carbitol | diethylene glycol monobutyl ether | 7 |
| Exxate 600 | alkyl oxo-alcohol esters of acetic acid | 8 |
| Tabs D | menthadiene solvent | 5 |
| Benzyl Alcohol | phenyl carbinol | 6 |
| Isopropyl Alcohol | | 9.5 |
| Methyl Carbitol | diethylene glycol monomethyl ether | 9 |
| Carbitol | diethylene glycol monoethyl ether | 8 |
| Isopar K | isoparaffinic hydrocarbon solvent | 1.5 |
| Kero K | paraffinic hydrocarbon solvent | 1.5 |

Nonaromatic solvents, especially those having a flash point higher than 140° F., are preferred for environmental reasons. Broadly, suitable solvents include without limitation aliphatic, aromatic, terpenic, paraffinic, isoparaffinic and olefinic hydrocarbons, alcohols and glycol ethers of the formula $C_nO(EO)_x(PO)_yH$ wherein $C_n$ is an alkyl radical having n carbon atoms (n is from 1 to 6), EO is a —$CH_2$—$CH_2O$— (x is an integer from 0 to 4), PO is —$CH(CH_3)$—$CH_2O$— or —$CH_2$—$CH(CH_3)O$— (y is an integer from 0 to 4), benzyl alcohol, alkyloxoalcohol esters of lower aliphatic acids, substituted glycols of the formula $C_nO(EO)_xC_n$ (with n and x as defined above, glycols of the formula $H(EO)_xH$ and $H(PO)_yH$ (wherein EO, PO, x and y have been defined above) and acetate esters of glycol ethers.

The progenitor solution will contain at least one surfactant soluble in the solvent. The choice of surfactant depends on the compatibility with the solvent and/or solvent composition of the progenitor solution and the soil to be removed. Compatibility of the surfactant with solvent and soil is determined from supplier information or is within the ordinary skill in the art including at times routine experimentation. Preferably, the cleaning emulsion will contain at least two surfactants which may be nonionic and/or cationic and or amphoteric. Both (or all) surfactants are preferably incorporated in the progenitor solution. Anionic and zwitterionic surfactants can also be used.

Suitable surfactants generally include without limitation those disclosed, e.g., in Norris U.S. Pat. No. 3,663,961 (May 23, 1972) incorporated by reference and in *Surfactants Interfacial Phenomena* by Milton J. Rosen, John Wiley & Sons, 1978, pp. 1-17, also incorporated by reference. Other suitable surfactants include:

Suitable anionic surfactants generally include without limitation water-soluble salts of alkylbenzene sulfonates, alkyl sulfates, alkyl polyethoxy ether sulfates, paraffin sulfonates, alpha-olefin sulfonates, alpha-sulfocarboxylates and their esters, alkyl glyceryl ether sulfonates, fatty acid monoglyceride sulfates and sulfonates, alkyl phenol polyethoxy ether sulfates, 2-acryloxy-alkane-1-sulfonates, and beta-alkyloxy alkane sulfonates. For more specific examples, see U.S. Pat. No. 4,414,128, col. 3, lines 60-68 & col. 4, incorporated by reference.

Suitable nonionic surfactants include alkoxylated compounds produced by the condensation of alkylene oxide groups with an organic hydrophobic compound (aliphatic, aromatic or arylaliphatic). The length of the polyoxy alkylene group should be controlled (which can be accomplished in a manner known per se) so that the resulting surfactant is liquid and, where applicable, soluble in the solvent or solvent mixture used for the progenitor solution. More specific examples of these nonionic surfactants are disclosed, e.g., in U.S. Pat. No. 4,414,128, col. 5, lines 14-68 and col. 6, lines 1-14, incorporated by reference.

Suitable cationic surfactants include without limitation those disclosed in U.S. Pat. No. 3,813,345, col. 8, lines 42-53, incorporated by reference.

Amphoteric and zwitterionic surfactants include without limitation those disclosed in U.S. Pat. No. 4,414,128, col. 6, lines 31-66, incorporated by reference.

Preferred are surfactants such as nonionic ethoxylates (e.g. Igepals, Surfonics) anionic surfactants (such as Sulframin, Sulframin AOS) and cationic surfactants (such as Bardacs, Hyamine, Genamin 8). All materials disclosed or referenced herein are readily commercially available.

In general, the choice of emulsifier will depend on (a) the desired stability of the emulsion; (b) whether an oil-in-water or a water-in-oil emulsion is desired; and (c) the type of soil to be removed. A hydrophilic emulsifier will best stabilize O/W emulsions while a liophilic emulsifier stabilizes best W/O emulsions. A highly oxidized soil would require a more hydrophobic emulsifier than a relatively unoxidized soil. In principle any emulsifier that contributes to the desired PIF value can be used, including without limitation those disclosed in Aronson U.S. Pat. No. 4,606,913.

Preferred examples of emulsifiers include the following:

TABLE 2

| Emulsifier | Composition | Supplier Example |
|---|---|---|
| Igepal Ca 420 | Ethoxylated octyl phenol | GAF |
| Brij 92 | Ethoxylated (2) oleyl ether | ICI |
| Span 80 | Sorbitan monooleate | ICI |
| Span 85 | Sorbitan trioleate | ICI |
| Atmos 300 | Mono and di glycerides of fat forming fatty acids | ICI |
| Drewmulse GMO | Glycerol monooleate | PVO |
| Kessco Ester | Glycerol monooleate | ARMAK |
| Drewpole 10-4-0 | Decaglycerol tetraoleate | PVO |
| Liposorb SQO | Sorbitan Sesquioleate | Lipo Chemicals |
| Magnesium oleate | | |
| Volpo 3 | Ethoxylated (3) oleyl ether | Croda |
| Hodag GMR | Glycerol mono ricinoleate | Hodag |
| Emulsogen E = | Combination of fatty amine salts with alkyl aryl polyglycol ethers | American Hoechst Corp. |
| Emulsogen M = | Fatty alcohol polyglycol ether | American Hoechst Corp. |
| Emulsogen A = | Fatty alcohol polyglycol ether ester | American Hoechst Corp. |
| Emulsogen B2M = | Amine salt of alkyl sulfamide carbonylic acid | American Hoechst Corp. |
| Emulsogen D.G. | Alkyl aryl polyglycol ether | American Hoechst Corp. |
| Emulgin IT-60 | Fatty acid polyglycol ester | Henkel Chem. Corp. |
| Emulgin TL-55 | Fatty acid polyglycol ester | Henkel Chem. Corp. |
| Icomeen T-15 | Fatty amine ethoxylates | BASF |
| Emulan FM | Triethanolamine monooleic acid ester | BASF |
| Marlowet OFW | Mixture of n-alkyl benzene sulfonate, carboxylic acid polyglycol esters and alkyl polyclycol ether | Huls Canada, Inc. |

The incorporation of electrolytes is not necessary, but if desired for a particular application, electrolytes could be used as additional optional ingredients. Suitable electrolytes include monovalent divalent and polyvalent inorganic salts such as halides sulfates, carbonates and phosphates, of alkali metals, alkaline earth metals and heavy metals and mixtures of such salts. It is emphasized, however, that electrolytes are not necessary.

The progenitor solutions of the present invention are prepared by blending surfactants, emulsifiers and solvents (as well as optional ingredients such as thickening agents, dyes, perfumes, preservatives, anti-oxidants, etc.) in normal conventional equipment commonly used in the chemical specialty industry. For example, simple mixing or blending vessels such as stainless steel tanks equipped with an agitator (e.g. a Lightnin ™ mixer) are sufficient. Solvents are added first into the blending vessel. The agitation is started and the remaining ingredients surfactants, emulsifiers, etc. are added and blended until the mixture is homogeneous. This may require mixing at e.g. 50–200 rpm for several minutes to several hours depending on tank volume and agitator size.

The emulsions of the present invention are prepared by simple dilution of the progenitor solution into water with normal agitation. The water can be any temperature, e.g. as required for the cleaning application, but it is preferably warm (e.g. 50° C. or above). Soft water is preferred.

The emulsions can contain from 0.1 to 80% of the progenitor solution. Generally, a 1–10% concentration is sufficient for most industrial cleaning jobs, and is preferred.

The invention is further illustrated below by reference to specific non-limiting Examples.

EXAMPLE 1

Soil Removal Assessment

Standard tarsand soils were prepared by smearing 2.5 cm × 2.5 cm × 0.3 cm tarsand (alternatively jesco grease or 80–10 mixtures of tarsand and jesco could have been similarly prepared) on Q-panels (i.e., metal testing panels having a Q-shaped hole) and baking the applied soil for 30 minutes at 120° C. The panels were thereafter left to attain atmospheric equilibrium for 24 hours. This procedure is referred to in the claims as Q-panel testing.

Other test soils such as multi-use and automotive greases, gear oils, or automotive under coatings could be prepared for assessment in the same manner.

Finally, test soils could be alternatively prepared as follows: Roofing tars or soils containing plasticizers or any type of soil combination (greases, oils, waxes, etc.) are smeared on metal panels and exposed to the elements (e.g., on roofs or walls) for aging. The applied soil thickness is in all cases controlled via an applicator gauge.

EXAMPLE 2

Preparation of Progenitor Solutions and Emulsions

To a 2000 ml beaker containing a magnetic stirring bar placed on a magnetic stirrer 100 g of Solvesso 150 were added followed by 100 g Tabs D, 100 g methyl carbitol, 75 g of Rexonic 91-8, 75 g Hyamine 3500 and finally 50 g of Icomeen T-15. The final mixture was stirred for 30 minutes and then stored for use. This resulted in progenitor solution 20. Additional solutions were made in the same manner with substitutions of various ingredients, In all cases the emulsifier was added last to the mixture of solvent(s) and surfactant.

The ingredients and amounts for all the resulting progenitor solutions of this Example 2 are set forth in Table 3. In each case only one emulsifier was used and thus Solution No. 1, for example, is really 3 different compositions: one with Emulsogen IT, one with Emulsogen SHT and one with Emulsogen EL.

TABLE NO. 3

STANDARD SOIL REMOVAL EVALUATION FOR FOUR EMULSIFIER SYSTEMS AT IDENTICAL SOLVENT COMPOSITIONS

| Progenitor Solution No. | 1 | 2 | 3 | 4 | 5 | 6 | 7 | 8 | 9 | 10 | 11 |
|---|---|---|---|---|---|---|---|---|---|---|---|
| Emulsifier % | | | | | | | | | | | |
| Emulsogen IT nonionic | 5 | 5 | 5 | 5 | 5 | 5 | 5 | 5 | 5 | 5 | 5 |
| Emulsogen SHT anionic | 5 | 5 | 5 | 5 | 5 | 5 | 5 | 5 | 5 | 5 | 5 |
| Emulsogen EL nonionic | 5 | 5 | 5 | 5 | 5 | 5 | 5 | 5 | 5 | 5 | 5 |
| Icomeen T-15 cationic | — | — | — | — | — | — | — | — | — | — | — |
| Surfactant % | | | | | | | | | | | |
| Igepal CO-630 nonionic | 7.5 | 7.5 | 7.5 | — | — | — | — | — | — | — | — |
| Hyamine 3500 cationic | 7.5 | 7.5 | 7.5 | 7.5 | 7.5 | 7.5 | 7.5 | 7.5 | 7.5 | 7.5 | 7.5 |
| Rexonic N91-8 nonionic | — | — | — | 7.5 | 7.5 | 7.5 | 7.5 | 7.5 | 7.5 | 7.5 | 7.5 |
| Solvent % | | | | | | | | | | | |
| Solvesso 150 | 70 | 70 | 60 | 60 | 60 | 60 | 50 | 60 | 60 | 50 | 40 |
| Butyl Carbitol | 10 | — | 10 | 10 | — | — | — | — | — | — | — |
| Tabs D | — | — | 10 | 10 | 10 | 10 | 10 | 10 | 10 | 10 | 10 |
| Exxate 600 | — | 10 | — | — | — | — | — | — | — | — | — |
| Benzyl Alcohol | — | — | — | — | 10 | — | — | — | — | — | — |
| Isopropyl Alcohol | — | — | — | — | — | 10 | 20 | — | — | — | — |
| Methyl Carbitol | — | — | — | — | — | — | — | 10 | — | — | — |
| Carbitol | — | — | — | — | — | — | — | — | 10 | 20 | 30 |
| Isopar K | — | — | — | — | — | — | — | — | — | — | — |
| Kero 1-K | — | — | — | — | — | — | — | — | — | — | — |
| Soil Removal % | | | | | | | | | | | |
| 10% aqu. Emulsogen IT | 0 | 0 | 98 | 95 | 80 | 80 | 80 | 95 | 95 | 95 | 90 |
| 10% aqu. Emulsogen SHT | 15 | 0 | 95 | 95 | 50 | 75 | 90 | 90 | 90 | 80 | 75 |
| 10% aqu. Emulsogen EL | 30 | 0 | 95 | 90 | 25 | 90 | 65 | 80 | 80 | 95 | 80 |
| 10% aqu. Icomeen T-15 | — | — | — | — | — | — | — | — | — | — | — |

| Progenitor Solution No. | 12 | 13 | 14 | 15 | 16 | 17 | 18 | 19 | 20 | 21* | 21-1 |
|---|---|---|---|---|---|---|---|---|---|---|---|
| Emulsifier % | | | | | | | | | | | |
| Emulsion IT nonionic | 5 | 5 | 5 | 5 | 5 | 5 | 5 | — | — | — | — |
| Emulsogen SHT anionic | 5 | 5 | 5 | 5 | 5 | 5 | 5 | — | — | — | — |
| Emulsogen EL nonionic | 5 | 5 | 5 | 5 | 5 | 5 | 5 | — | — | — | — |
| Icomeen T-15 cationic | — | — | — | — | — | — | — | 5 | 5 | 5 | 9.2 |
| Surfactant % | | | | | | | | | | | |

TABLE NO. 3-continued

STANDARD SOIL REMOVAL EVALUATION FOR FOUR
EMULSIFIER SYSTEMS AT IDENTICAL SOLVENT COMPOSITIONS

| | | | | | | | | | | | |
|---|---|---|---|---|---|---|---|---|---|---|---|
| Igepal CO-630 nonionic | — | — | — | — | — | — | — | 7.5 | — | — | 2.3 |
| Hyamine 3500 cationic | 7.5 | 7.5 | 7.5 | 7.5 | 7.5 | 7.5 | 7.5 | 7.5 | 7.5 | 7.5 | 3.9 |
| Rexonic N91-8 nonionic | 7.5 | 7.5 | 7.5 | 7.5 | 7.5 | 7.5 | 7.5 | — | 7.5 | 7.5 | — |
| Solvent % | | | | | | | | | | | |
| Solvesso 150 | 70 | 60 | — | — | 80 | — | — | 60 | 60 | 80 | — |
| Butyl Carbitol | — | — | — | — | — | — | — | 10 | — | — | 30.1 |
| Tabs D | — | — | — | 80 | — | — | — | 10 | 10 | — | — |
| Exxate 600 | — | — | — | — | — | — | — | — | — | — | — |
| Benzyl Alcohol | — | — | — | — | — | — | — | — | — | — | — |
| Isopropyl Alcohol | — | — | — | — | — | — | — | — | — | — | — |
| Methyl Carbitol | — | — | — | — | — | — | — | — | 10 | — | — |
| Carbitol | 10 | 20 | — | — | — | — | — | — | — | — | — |
| Isopar K | — | — | 80 | — | — | 80 | — | — | — | — | 54.5 |
| Kero 1-K | — | — | — | — | — | — | 80 | — | — | — | — |
| Soil Removal % | | | | | | | | | | | |
| 10% aqu. Emulsogen IT | 85 | 80 | 0 | 80 | 75 | 0 | 0 | — | — | — | — |
| 10% aqu. Emulsogen SHT | 90 | 80 | 0 | 80 | 50 | 0 | 0 | — | — | * | — |
| 10% aqu. Emulsogen EL | 85 | 60 | 0 | 80 | 65 | 5 | 0 | — | — | — | — |
| 10% aqu. Icomeen T-15 | — | — | — | — | — | — | — | 98 | 98 | — | 30 |

*unstable mother solution

Emulsions were made containing 10% of each progenitor solution in about 50° C. water by introducing a 10% vol. aliquot of progenitor solution into 90% vol. of water with agitation until homogeneous.

As apparent from Table 3, the concentration of the emulsifier was maintained at a constant level (5%) throughout all systems tested (except for progenitor solution 21-1). The same was done with the surfactant concentration (15%). This was done to normalize the data and does not imply that the emulsifiers and surfactants are limited to the amounts listed in Table 3. Various solvents of high and low polarity were used. The emulsions were transferred to a pump spray bottle and hand-sprayed onto the tarsand spray panels for one minute. (This is also part of the Q-panel testing procedure.)

The amount of tarsand removed was visually estimated and recorded. The results are also set forth in Table 3. The soil removal ability for various emulsions can be vastly different even when the ingredients are present in the same proportions. See in particular the systems that have identical surfactants and solvents but different emulsifiers. See also the systems that have the same surfactants and emulsifiers but different solvents. The emulsion stability was tested at 4° C., 35° C. and at ambient temperatures for those emulsions that gave satisfactory cleaning performance. Stability testing involved preparations of emulsions containing 10% and 20% of a mother solution in water and left to stand at 4° C. for three months; ambient temperature for three months and 35° C. for three months. No coalescence was observed at this time; only occasionally minimal "creaming" occurred at 35° C.

EXAMPLE 3

Correlation of Polarity Index Function and Cleaning Ability

The collective polarities for each solvent mixture of each progenitor solution in Table 3 are set forth in Table 4 below:

TABLE 4

| COLLECTIVE POLARITIES FOR SOLVENT | |
|---|---|
| Progenitor Solution | of Solvent Polarity |
| 1 | 2.8 |
| 2 | 2.9 |
| 3 | 3.0 |
| 4 | 3.0 |
| 5 | 2.9 |
| 6 | 3.25 |
| 7 | 3.9 |
| 8 | 3.2 |
| 9 | 3.1 |
| 10 | 3.6 |
| 11 | 4.1 |
| 12 | 2.95 |
| 13 | 3.5 |
| 14 | 1.2 |
| 15 | 4.0 |
| 16 | 2.4 |
| 17 | 1.2 |
| 18 | 1.2 |
| 19 | 3.0 |
| 20 | 3.2 |
| 21 | — |
| 21-1 | 2.93 |

The collective refractive indices for the emulsions of Table 4 are set forth in Table 5 below:

TABLE NO. 5

| | nD For Fractions of Emulsifiers, Surfactants and Solvents % | | | | | | | | | | |
|---|---|---|---|---|---|---|---|---|---|---|---|
| Mother Solution No. | 1 | 2 | 3 | 4 | 5 | 6 | 7 | 8 | 9 | 10 | 11 |
| Igepal CO-630 | .112 | .112 | .112 | — | — | — | — | — | — | — | — |
| Hyamine 3500 | .108 | .108 | .108 | .108 | .108 | .108 | .108 | .108 | .108 | .108 | .108 |
| Rexonic N91-8 | — | — | — | .109 | .109 | .109 | .109 | .109 | .109 | .109 | .109 |
| Solvesso 150 | 1.057 | .906 | .906 | .906 | .906 | .906 | .755 | .906 | .906 | .755 | .604 |
| Butyl Carbitol | .143 | — | .143 | .143 | — | — | — | — | — | — | — |
| Tabs D | — | — | .147 | .147 | .147 | .147 | .147 | .147 | .147 | .147 | .147 |
| Exxate 600 | — | 1.409 | — | — | — | — | — | — | — | — | — |
| Benzyl Alcohol | — | — | — | — | .154 | — | — | — | — | — | — |
| Isopropyl Alcohol | — | — | — | — | — | .138 | .276 | — | — | — | — |
| Methyl Carbitol | — | — | — | — | — | — | — | .143 | — | — | — |
| Carbitol | — | — | — | — | — | — | — | — | .142 | .284 | .426 |

TABLE NO. 5-continued

| nD For Fractions of Emulsifiers, Surfactants and Solvents % | | | | | | | | | | | |
|---|---|---|---|---|---|---|---|---|---|---|---|
| Isopar K | — | — | — | — | — | — | — | — | — | — | |
| Kero 1-K | — | — | — | — | — | — | — | — | — | — | |
| nD calculated | 1.420 | 1.267 | 1.416 | 1.413 | 1.424 | 1.408 | 1.395 | 1.413 | 1.412 | 1.403 | 1.394 |
| Emulsogen A | .0736 | | | | | | | | | | |
| Emulsogen EL | .0732 | | | | | | | | | | |
| Emulsogen M | .0730 | | | | | | | | | | |
| Emulsogen T | .0736 | | | | | | | | | | |
| Emulsogen IT | .0740 | | | | | | | | | | |
| Emulsogen SHT | .0731 | | | | | | | | | | |
| Emulsogen WT | .0739 | | | | | | | | | | |
| Emulsogen TL 55 | .0737 | | | | | | | | | | |
| Emulgin TI 60 | .0731 | | | | | | | | | | |
| Ecomeen T-15 | | | | | | | | | | | |

| Mother Solution No. | 12 | 13 | 14 | 15 | 16 | 17 | 18 | 19 | 20 | 21* | 21-1 |
|---|---|---|---|---|---|---|---|---|---|---|---|
| Igepal CO-630 | — | — | — | — | — | — | — | .112 | — | — | .0343 |
| Hyamine 3500 | .108 | .108 | .108 | .108 | .108 | .108 | .108 | .108 | .108 | — | .0575 |
| Rexonic N91-8 | .109 | .109 | .109 | .109 | .109 | .109 | .109 | — | .109 | — | — |
| Solvesso 150 | 1.057 | .906 | — | — | 1.208 | — | — | .906 | .906 | — | — |
| Butyl Carbitol | — | — | — | — | — | — | — | .143 | — | — | .429 |
| Tabs D | — | — | — | 1.180 | — | — | — | .147 | .147 | — | — |
| Exxate 600 | — | — | — | — | — | — | — | — | — | — | — |
| Benzyl Alcohol | — | — | — | — | — | — | — | — | — | — | — |
| Isopropyl Alcohol | — | — | — | — | — | — | — | — | — | — | — |
| Methyl Carbitol | — | — | — | — | — | — | — | — | .143 | — | — |
| Carbitol | .142 | .284 | 1.127 | — | — | — | — | — | — | — | — |
| Isopar K | — | — | — | — | — | 1.127 | — | — | — | — | — |
| Kero 1-K | — | — | — | — | — | — | 1.127 | — | — | — | .768 |
| nD calculated | 1.416 | 1.407 | 1.3444 | 1.397 | 1.425 | 1.344 | 1.344 | 1.490 | 1.487 | — | 1.424 |
| Emulsogen A | | | | | | | | | | | |
| Emulsogen EL | | | | | | | | | | | |
| Emulsogen M | | | | | | | | | | | |
| Emulsogen T | | | | | | | | | | | |
| Emulsogen IT | | | | | | | | | | | |
| Emulsogen SHT | | | | | | | | | | | |
| Emulsogen WT | | | | | | | | | | | |
| Emulsogen TL 55 | | | | | | | | | | | |
| Emulgin TI 60 | | | | | | | | | | | |
| Ecomeen T-15 | | | | | | | | | .0736 | .0736 | .1353 |

*unsuitable mother solution

FIGS. 1-3 represent a plot of the cleaning ability for tarsand soil removal against the polarity/index function (PIF) of each composition of Table 3.

The critical PIF value of about 6 in FIGS. 1-3 has been useful in determining the best cleaning emulsion for the following soils:
tarsand
tarsand-jesco grease
multi-use greases
gear oils Thus the data points in FIGS. 1-3 permit the selection of the most effective progenitor solution to assess the optimum efficacity for tarsand solid removal. Alternatively, they lend themselves to utilizing and selecting a different solvent and/or surface active agents to yield the desired polarity/index function (which should be at least equal to the critical value). (It should be noted that the index of water was not used in computing the datapoints of FIGS. 1-3 because all the emulsions had the same amount of water.) Ideally, the PIF of the progenitor solution should be as close to the critical value as will yield the desired cleaning ability. Further improvements in cleaning ability can be effected using no more than routine experimentation.

Similar graphs can be generated in the manner disclosed above for other emulsions of different ingredients and properties and for different cleaning tasks under different conditions. For example, emulsions containing 10% of progenitor solution #5 containing Emulsogen IT, and progenitor solution #3 containing Emulsogen SHT were effective against tarsand but not jesco oil. However, all compositions that worked on jesco (a tougher soil) also worked on tarsand. Particularly preferred progenitor solutions are solutions #15 and #20 in Table 3. Also the following are preferred:

| | 1 | 2 | 3 | 4 | 5 |
|---|---|---|---|---|---|
| Isopar K | 68.3 | | 39.3 | | 6.0 |
| d-limonene | 25.0 | 12.9 | 8.0 | | 87.0 |
| methyl carbitol | | 68.4 | 40.2 | 45.0 | |
| butyl carbitol | | | | 35.0 | |
| Ecomeen T | 1.7 | | | | 3.0 |
| Emulsogen A | 1.7 | 0.9 | 1.0 | 1.0 | 2.0 |
| Emulsogen T | 2.5 | | | | |
| Comperlan VOD | 0.8 | | | | 1.0 |
| Emulsogen T15 | | 4.9 | 4.5 | 4.5 | 1.0 |
| Hyamine DMB 451 | | 6.5 | 7.5 | 7.5 | |
| Igepal CO630 | | 6.5 | 7.5 | 7.5 | |

Also particularly preferred are emulsions containing from about 0.5 to about 30% of one of the foregoing preferred progenitor solutions.

What is claimed is:
1. An emulsion comprising
(a) 0.1-80% of a progenitor solution comprising the following ingredients:
   (i) 60 to 98% of at least one solvent
   (ii) 1 to 20% of at least one emulsifier surfactant, and
   (iii) 1 to 20% of at least one additional surfactant; and
(b) the balance being 99.9-20% water;
said emulsion having been prepared by simple addition of the progenitor solution to warm water with ordinary agitation; said ingredients being selected to yield a polarity index function (PIF) being defined as $$\frac{(10 N_D \cdot P)}{(10 - P)}$$

having a value at least equal to a previously established critical value wherein $N_D$ is the collective refractive index of the progenitor solution and P is the collective polarity of said at least one solvent; said critical value being the PIF value of emulsions that have an ability to clean at least 60% of a soil, when said emulsions are subjected to Q-panel testing and containing 10% of a progenitor solution.

2. The emulsion of claim 1, wherein said at least one solvent has a collective polarity of at least about 2.0 and said progenitor solution has a collective refractive index of at least about 1.35.

3. The emulsion of claim 2, wherein:
said solvent is selected from the group consisting of aliphatic, aromatic, terpenic, paraffinic, isoparaffinic and olefinic hydrocarbons, alcohols and glycol ethers of the formula $C_nO(EO)_x(PO)_yH$ wherein $C_n$ is an alkyl radical having n carbon atoms (n is from 1 to 6), EO is a —CH$_2$—CH$_2$O— (x is an integer from 0 to 4), PO is —CH(CH$_3$)—CH$_2$—O— or —CH$_2$—CH(CH$_3$)O— (y is an integer from 0 to 4), benzyl alcohol, alkyloxoalcohol esters of lower aliphatic acids, substituted glycols of the formula $C_nO(EO)_xC_n$ (with n and x as defined above), glycols of the formula H(EO)$_x$H and H(PO)$_y$H (wherein EO, PO, x and y have been defined above) and acetate esters of glycol ethers and combinations of at least two thereof;
said emulsifier is selected from the group consisting of cationic, nonionic and anionic emulsifier surfactants and combinations of at least two thereof; and
said surfactant is selected from the group consisting of nonionic, cationic, anionic, zwitterionic and amphoteric surfactants and combinations of at least two thereof.

4. The emulsion of claim 3, wherein said progenitor solution comprises 5% of one of a nonionic emulsifier consisting of a mixture of ethoxylated triglycerides with calcium aryl alkyl sulfonate, an anionic emulsifier consisting of the sodium salt of alkyl sulfonamido carboxylic acid and a nonionic emulsifier comprising a fatty acid polyglycol ester.

5. The emulsion of claim 4, wherein said progenitor solution comprises 7.5% of a cationic surfactant comprising nonylphenoxy poly(ethylenoxy)ethanol and 7.5% of one of nonionic surfactant comprising —N-alkyl(C$_{12}$, C$_{14}$, C$_{16}$,)dimethyl benzyl ammonium chloride and a nonionic surfactant comprising nonylphenoxy polyethoxy ethanol.

6. The emulsion of claim 5, wherein said solvent comprises 60% aromatic naphtha, 10% 2-(2-butoxyethoxy) ethanol and 10% cyclic aliphatic terpene.

7. The emulsion of claim 5, wherein said solvent comprises 60% aromatic naphtha, 10% cyclic aliphatic terpene and 10% benzyl alcohol and said emulsifier is a fatty acid polyglycol ester.

8. The emulsion of claim 5, wherein said solvent comprises 60% aromatic naphtha, 10% cyclic aliphatic terpene, and 10% isopropyl alcohol.

9. The emulsion of claim 5, wherein said solvent comprises 50% aromatic naphtha, 10% cyclic aliphatic terpene, and 20% isopropyl alcohol.

10. The emulsion of claim 5, wherein said solvent comprises 60% aromatic naphtha, 10% cyclic aliphatic terpene, and 10% diethylene glycol monomethyl ether.

11. The emulsion of claim 5, wherein said solvent comprises 60% aromatic naphtha, 10% cyclic aliphatic terpene, and 10% diethylene glycol monoethyl ether.

12. The emulsion of claim 5, wherein said solvent comprises 50% aromatic naphtha, 10% cyclic aliphatic terpene, and 20% diethylene glycol monoethyl ether.

13. The emulsion of claim 5, wherein said solvent comprises 40% aromatic naphtha, 10% cyclic aliphatic terpene, and 30% diethylene glycol monoethyl ether.

14. The emulsion of claim 5, wherein said solvent comprises 70% aromatic naphtha, and 10% diethylene glycol monoethyl ether.

15. The emulsion of claim 5, wherein said solvent comprises 60% aromatic naphtha, and 20% diethylene glycol monoethyl ether.

16. The emulsion of claim 5, wherein said solvent comprises 80% cyclic aliphatic terpene.

17. The emulsion of claim 5, wherein said solvent comprises 80% aromatic naphtha.

18. The emulsion of claim 3, wherein said progenitor solution comprises 5% cationic emulsifier of fatty amine ethoxylates.

19. The emulsion of claim 18, wherein said progenitor solution comprises 7.5% of a cationic surfactant and 7.5% of a nonionic ethoxylate surfactant.

20. The emulsion of claim 19, wherein said solvent is 60% aromatic naphtha, 10% 2-(2-butoxyethoxy) ethanol, and 10% cyclic aliphatic terpene.

21. The emulsion of claim 19, wherein said solvent is 60% aromatic naphtha, and 10% 2-(2-butoxyethoxy) ethanol.

22. An emulsion comprising
(a) 0.1–80% of a progenitor solution comprising the following ingredients:
(i) 60 to 98% of at least one solvent
(ii) 1 to 20% of at least one emulsifier surfactant, and
(iii) 1 to 20% of at least one additional surfactant; and
(b) the balance being 99.9–20% water;
said emulsion having been prepared by simple addition of the progenitor solution to warm water with ordinary agitation; said ingredients being selected to yield a polarity index function (PIF) being defined as $$\frac{(10 N_D \cdot P)}{(10 - P)}$$

having a value at least equal to a previously established critical value wherein $N_D$ is the collective refractive index of the progenitor solution and P is the collective polarity of said at least one solvent; said critical value being the PIF value of emulsions that would have a substantially increased ability to clean a soil compared to emulsions having a PIF below said critical value.

23. An emulsion comprising:
(a) 0.1–80% of a progenitor solution comprising the following ingredients:
i) 60 to 98% of at least one solvent;
ii) 1 to 20% of at least one emulsifier surfactant; and iii) 1 to 20% of at least one additional surfactant; and (b) the balance being 99.9-20% water;

said emulsion prepared by simple addition of the progenitor solution to warm water with ordinary agitation; said ingredients being selected to yield a polarity index function (PIF) being defined as $(10N_D \cdot P)/(10-P)$ having a value at least equal to a previously established critical value wherein $N_D$ is the collective refractive index of the progenitor solution and P is the collective polarity of said at least one solvent; said critical value being the PIF value of emulsions that have an ability to clean at least 60% of a soil, when said emulsions are subjected to Q-panel testing and containing 10% of a progenitor solution; wherein said solvent is selected from the group consisting of: aromatic hydrocarbons solvent diethylene glycol monobutyl ether, diethylene glycol monomethyl ether, diethylene glycol monoethyl ether, 2-(2-butoxyethoxy) ethanol, cyclic aliphatic terpene, alkyl oxo-alcohol esters of acetic acid, menthadiene solvent, phenyl carbinol, isoparaffinic hydrocarbon solvents, paraffinic hydrocarbon solvents and mixtures thereof;

said emulsifier is selected from the group consisting of: ethoxylated octyl phenol, ethoxylated (2) oleyl ether, sorbitan monooleate, sorbitan trioleate, mono and di glycerides of fat-forming fatty acids, glycerol monooleate, decaglycerol tetraoleate, sorbitan sesquioleate, ethoxylated (3) oleyl ether, glycerol mono ricinoleate, mixture of fatty amine salts with alkyl, aryl poly-glycol ethers, fatty alcohol polyglycol ether, fatty alcohol polyglycol ether ester, amine salt of alkyl sulfamide carboxylic acid, alkyl aryl polyglycol ether, fatty acid polyglycol ester, fatty acid polyglycol ester, fatty amine ethoxylates, triethanolamine monooleic acid ester, mixture of n-alkyl benzene sulfonate, carboxylic acid polyglycol esters and alkyl polycylcol ether and mixtures thereof.

* * * * *